United States Patent
Grinberg et al.

(10) Patent No.: US 6,179,039 B1
(45) Date of Patent: Jan. 30, 2001

(54) METHOD OF REDUCING DISTORTION IN A SPRAY FORMED RAPID TOOL

(75) Inventors: Grigoriy Grinberg, Sylvania, OH (US); Charles Chen, Wixom, MI (US); David Robert Collins, Southgate, MI (US); Jeffrey Alan Kinane, Birmingham, MI (US); Paul Earl Pergande, Beverly Hills, MI (US)

(73) Assignee: Visteon Global Technologies, Inc., Dearborn, MI (US)

(*) Notice: Under 35 U.S.C. 154(b), the term of this patent shall be extended for 0 days.

(21) Appl. No.: 09/275,997

(22) Filed: Mar. 25, 1999

(51) Int. Cl.$^7$ .................................................. B22D 23/00
(52) U.S. Cl. ........................ 164/4.1; 164/46; 427/455
(58) Field of Search ........................ 164/46, 4.1; 427/8, 427/455

(56) References Cited

U.S. PATENT DOCUMENTS

| | | |
|---|---|---|
| 4,087,568 | 5/1978 | Fay et al. . |
| 4,172,020 | 10/1979 | Tisone et al. . |
| 4,593,360 | 6/1986 | Cocks . |
| 4,736,304 | 4/1988 | Doehler . |
| 4,843,576 | 6/1989 | Smith et al. . |
| 4,902,398 | 2/1990 | Homstad . |
| 5,009,367 | 4/1991 | Nielsen . |
| 5,009,485 | 4/1991 | Hall . |
| 5,047,612 | 9/1991 | Savkar et al. . |
| 5,189,781 | 3/1993 | Weiss et al. . |
| 5,319,568 | 6/1994 | Bezaire . |
| 5,370,902 | 12/1994 | Vigneron et al. . |
| 5,529,809 | 6/1996 | Glovan et al. . |
| 5,612,887 | 3/1997 | Laube et al. . |
| 5,689,415 | 11/1997 | Calotychos et al. . |
| 5,751,607 | 5/1998 | Ohta . |
| 5,770,273 | 6/1998 | Offer et al. . |
| 5,967,218 | * 10/1999 | Pergande et al. ............... 164/46 |

FOREIGN PATENT DOCUMENTS

| | | |
|---|---|---|
| 195 45 005 A1 | 6/1997 | (DE) . |
| 198 37 400 C1 | 11/1999 | (DE) . |
| 0 781 625 A1 | 7/1997 | (EP) . |
| 8089859 | 4/1996 | (JP) . |

* cited by examiner

Primary Examiner—Kuang Y. Lin
(74) Attorney, Agent, or Firm—Larry I. Shelton

(57) ABSTRACT

A method of reducing distortion in a spray formed rapid tool includes the steps of making a model of a desired tool and constructing a ceramic pattern as the inverse of the model. The method also includes the steps of building a thermal model of the desired tool from a solid model of the ceramic pattern and applying thermal boundary conditions to the thermal model based on known conditions. The method also includes the steps of running the thermal model to produce a temperature distribution of the desired tool and determining any temperature deviations in the temperature distribution above a predetermined value. The method further includes thermally spraying a metal material against the ceramic pattern to form the desired tool if there are no temperature deviations in the temperature distribution above the predetermined value.

20 Claims, 4 Drawing Sheets

METHOD OF REDUCING DISTORTION IN A SPRAY FORMED RAPID TOOL

BACKGROUND OF THE INVENTION

1. Field of the Invention

The present invention relates generally to spray formed rapid tools and, more specifically, to a method of reducing distortion in a spray formed rapid tool.

2. Description of the Related Art

It is known to make a spray formed rapid tool. In spray forming, a master model of a desired tool is produced using a free form fabrication technique. This master model is then used to create a ceramic pattern, which is the reverse of the desired tool to be produced. The resulting ceramic pattern is the receptor onto which metal is sprayed to form a deposit in the shape of the desired tool. Typically, the spray forming process uses a wire-arc spraying. In wire-arc spraying, electric current is carried by two electrically conductive, consumable wires with an electric arc forming between the wire tips. A high-velocity gas jet blowing from behind the consumable wires strips away the molten metal, which continuously forms as the wires are melted by the electric arc. The high-velocity gas jet breaks up or atomizes the molten metal into finer particles in order to create a fine distribution of molten metal droplets. The atomizing gas then accelerates the droplets away from the wire tips to the ceramic pattern where the molten metal droplets impact the ceramic pattern to incrementally form a deposit in the shape of the desired tool. The completed desired tool is then mounted and used to produce parts in conventional stamping, die casting, or molding process.

During the spray forming process, the spray formed rapid tool may have a varied temperature distribution across the ceramic pattern and each layer thereof. This can result in distortion of the spray formed rapid tool as shrinkage of the sprayed metal occurs. Recently, there has been a need to create the spray formed rapid tool geometrically accurate. To accomplish this, a number of trial spray runs are conducted to determine ideal spray parameters to obtain a uniform temperature distribution.

Although the above process for making a spray formed rapid tool has worked well, it suffers from the disadvantage that trial spray runs have to be conducted to determine the spray parameters for spraying the spray formed rapid tool. Another disadvantage of the above process is that the spray parameters are achieved by trial and error. Yet another disadvantage of the above process is that to scale between different sized tools with different geometric features, estimation occurs which is undesired. Still another disadvantage of the above process is that the trial spray runs and estimation are time consuming and result in significant development costs for a spray formed rapid tool.

SUMMARY OF THE INVENTION

Accordingly, the present invention is a method of reducing distortion in a spray formed rapid tool. The method includes the steps of making a model of a desired tool, constructing a ceramic pattern as the inverse of the model, and building a thermal model of the desired tool from a solid model of the ceramic pattern. The method also includes the steps of applying thermal boundary conditions to the thermal model based on known conditions. The method also includes the steps of running the thermal model to produce a temperature distribution of the desired tool and determining any temperature deviations in the temperature distribution above a predetermined value. The method further includes the steps of thermally spraying a metal material against the ceramic pattern to form the desired tool if there are no temperature deviations in the temperature distribution above the predetermined value.

One advantage of the present invention is that a method is provided of reducing distortion in a spray formed rapid tool. Another advantage of the present invention is that the method has greater probability to create spray formed rapid tools accurately the first time. Yet another advantage of the present invention is that the method eliminates conducting trial spray runs to determine the spray parameters, resulting in a shortened product development cycle time. Still another advantage of the present invention is that the method reduces the estimation required to scale parameters between different sized tools with different geometric features. A further advantage of the present invention is that the method reduces development costs.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1A:
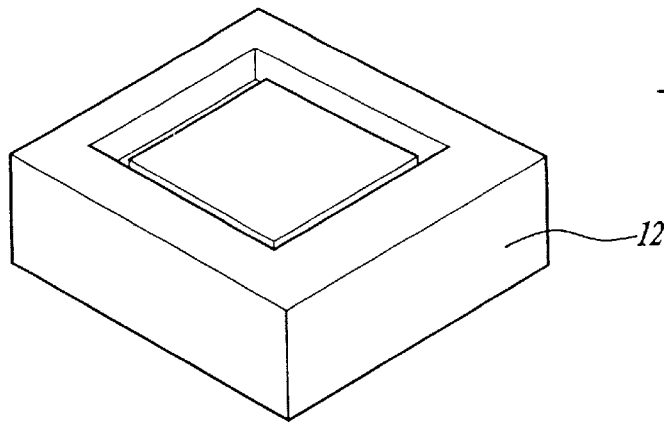
FIGS. 1A, 1B, 1C, 1D and 1E are a schematic flow diagram of a method of forming a spray formed rapid tool.
Figure 1B:
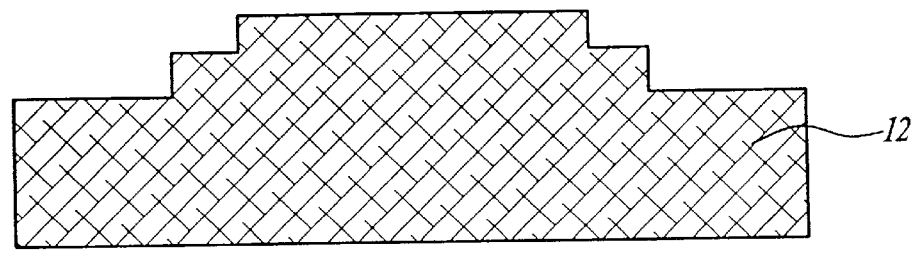

Referring to the drawings and in particular FIGS. 1A through 1E, one embodiment of a method of forming a spray formed rapid tool is shown. The method begins by creating or making a master model 12 of a desired tool as illustrated in FIGS. 1A and 1B. Typically, the master model 12 may be produced by using a CAD/CAM design and a free-form fabrication system such as stereolithography. Such a process is disclosed in U.S. Pat. No. 5,658,506 to White et al., the disclosure of which is hereby incorporated by reference.

Figure 1C:
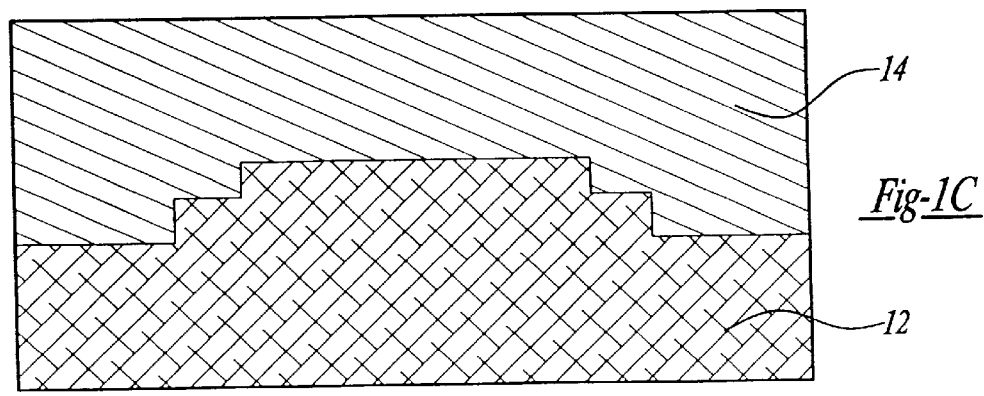

The method also includes the step of constructing a ceramic pattern 14 as the inverse of the master model 12 as illustrated in FIG. 1C. To create the ceramic pattern 14, the bottom of the master model 12 is adhered to a base plate (not shown) of an open box (not shown); the box is open at its top. A desired ceramic slurry is poured around the master model 12 to form the ceramic pattern 14 and completely covers its geometry to a thickness of greater than one (1) inch at the thinnest wall section. Entrapped air is minimized by vibrating the box and slurry contained therein on a table (not shown), preferably in a vacuum chamber (not shown). Depending on the character of the ceramic slurry that is employed, the ceramic pattern 14 is either (i) air dried, removed and then fired to finally cure it, or (ii) the ceramic slurry is freeze cast to temperatures around −30 F. and the master model 12 removed prior to the ceramic pattern 14 thawing out, or (iii) the ceramic slurry is dried and, then the master model 12 burned out while the ceramic pattern 14 is undergoing curing. The latter is conventional investment casting and is not desirable because of the possibility of shell cracking, lower shell strength and poor geometric comparability with the spray process. Freeze casting is preferred.

The master model 12 is removed from the cured ceramic pattern 14 by installing screws (not shown) in the back of the master model 12 and pulling the master model 12 out physically. Alternatively, a stationary plate (not shown) may be used through which the extraction screws extend and the master model 12 is removed by turning the screws inward to pull against the stationary plate and also pull the master model 12 away from the ceramic pattern 14.

The ceramic material for the ceramic pattern 14 is selected to provide a good surface finish (such as 1–4 microns), good thermal shock resistance value at temperatures of 1800≧2400 F., able to withstand up to 2400 F. temperatures, have compressive strengths of about 9,000 psi and possess a low shrinkage (less than 0.3 percent) and possess low thermal expansion (1.0–4.0 E-6/degree F.) and have no reaction to molten metal. The ceramic material is selected to be capable of withstanding a molten metal environment and have a very smooth surface with good dimensional accuracy. The ceramic materials used include aluminum oxide ceramics, dental ceramics, investment casting slurries, fused silica and freeze cast alumina.

Figure 1D:
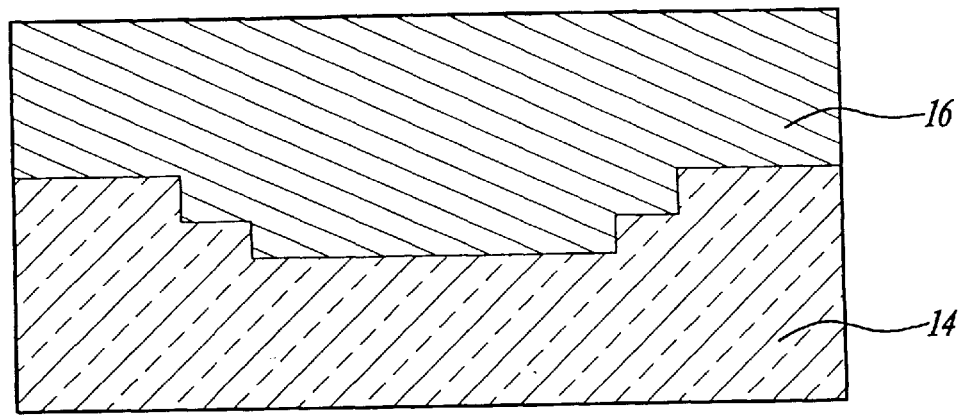

The method includes the step of thermally spraying a metal material against the ceramic pattern 14 to form a spray formed rapid tool 16 as the desired tool. Such step is desirably carried out by the wire arc process previously described. Another method to carry out the step of thermally spraying is the osprey process wherein a semi-solid slurry of hardenable metal material is sprayed from an induction heated nozzle supply and is impelled against the ceramic pattern 14 with a high velocity due to the high pressure gases that atomize the molten fluid. Metal droplets are formed from a melt that is atomized by gas (not from wire or powder). Continuous spraying is carried out to build up a layer that exceeds at least one-quarter (¼) inch in thickness, at its thinnest section. As the spray is applied and built up, the spray formed rapid tool 16 is formed as illustrated in FIG. 1D.

Metals usable for this purpose include metals such as zinc and high temperature high strength carbon steel. These include certain tool steels such as A2 and plain carbon steel with (0.8% carbon by weight) as well as maraging steels. Maraging steels are difficult to machine and are seldom used for tooling, but can be readily spray formed to produce a desirable microstructure.

Figure 1E:
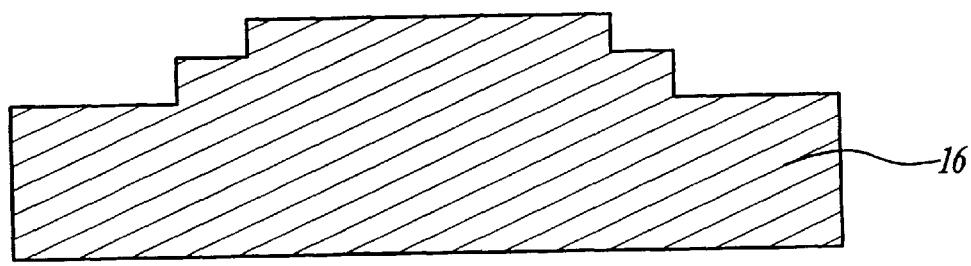

Once the spray formed rapid tool 16 is formed, the ceramic pattern 14 is removed by chipping, grit blasting, or using a water jet to leave the completed spray formed rapid tool 16 as illustrated in FIG. 1E. The completed spray formed rapid tool 16 may then be used in a die-set mold mounted in an injection molding machine (not shown) and used to produce molded parts. It should also be appreciated that the completed spray formed rapid tool 16 may be used for stamping, die casting, blow molding or other material forming operations.

Figure 2:
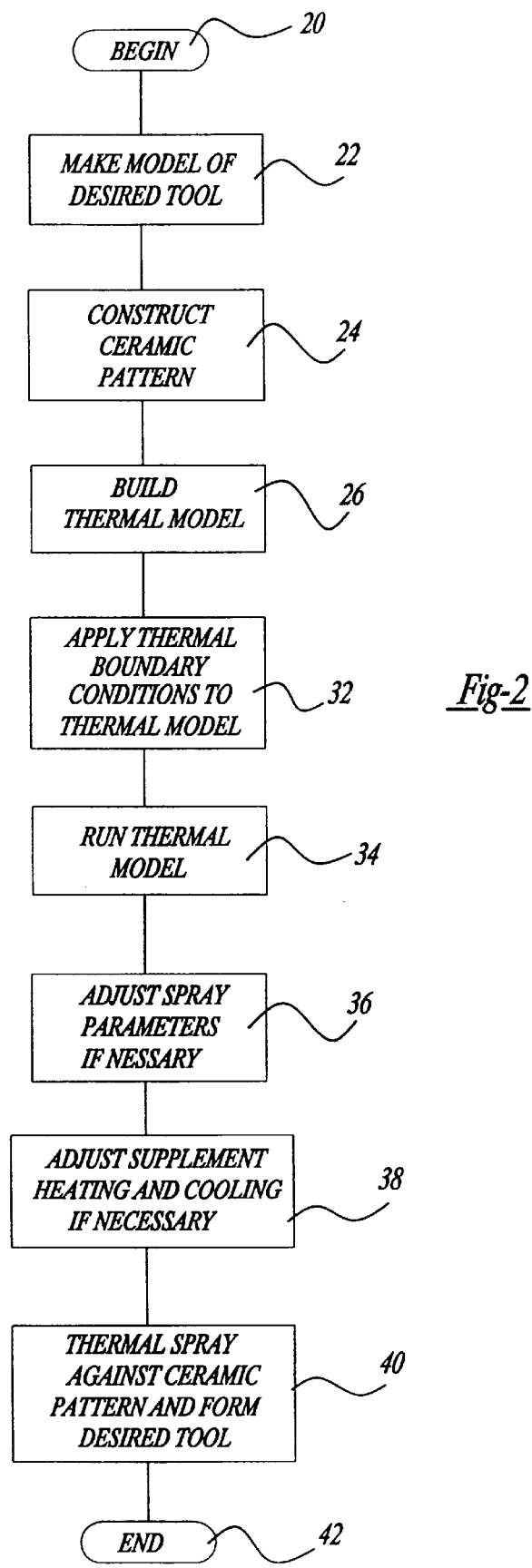
FIG. 2 is a flowchart of a method, according to the present invention, of reducing distortion in the spray formed rapid tool formed by the method of FIG. 1.

Referring to FIG. 2, a method, according to the present invention, of reducing distortion in the spray formed rapid tool 16 is shown. The method begins in bubble 20 and advances to block 22. In block 22, the method includes the step of making the master model 12 of a desired tool as previously described. The method then advances to block 24 and includes the step of constructing the ceramic pattern 14 as previously described. The method advances to block 26 and includes the step of building a thermal model of the desired tool from a solid model of the geometry of the ceramic pattern 14.

Figure 3:
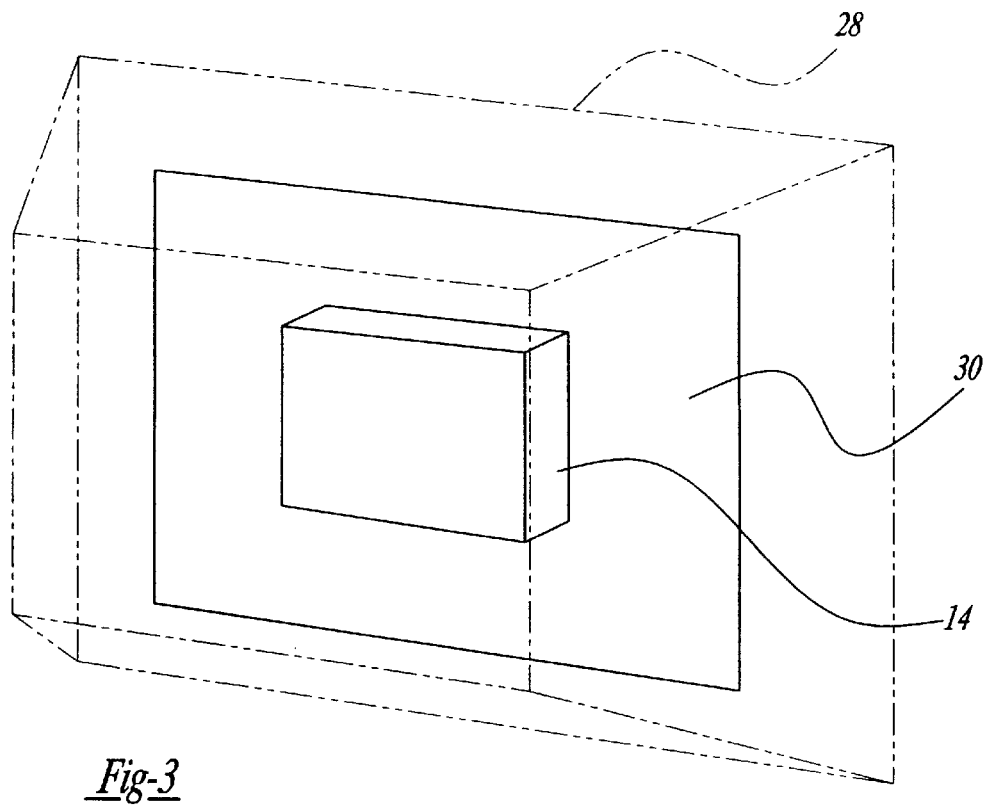
FIG. 3 is a diagram of a spray plane for the method of FIG. 2.

In block 26, the thermal model is built as a computer program. To build the thermal model, computational fluid dynamics are used to model the heat transfer properties of the ceramic pattern 14 and thermal spray pattern. The geometry of the ceramic pattern 14 and thermal properties of the ceramic pattern 14 are inputted into the thermal model. The thermal properties of the ceramic pattern 14 and spray material such as thermal conductivity and specific heat are input into the thermal model. Measured values are used whenever possible. As illustrated in FIG. 3, a thermal spray pattern 28 having a generally trapezoidal shape is shown disposed over the ceramic pattern 14 mounted to an aluminum plate 30. The thermal spray pattern 28 is also input into the thermal model as the pattern of the thermal spray gun tool.

Next, the method advances to block 32 and includes the step of applying thermal boundary conditions to the thermal model. In this step, the thermal boundary conditions include preheat of the ceramic pattern such as 200° C., cooling such as airflow in the spray booth for the thermal spray gun tool, and thermal loads such as from the thermal spray gun tool. These thermal conditions are inputted into the thermal model based on existing known conditions of thermal spray gun tool paths and thermal spray parameters. The method then advances to block 34.

Figure 4:
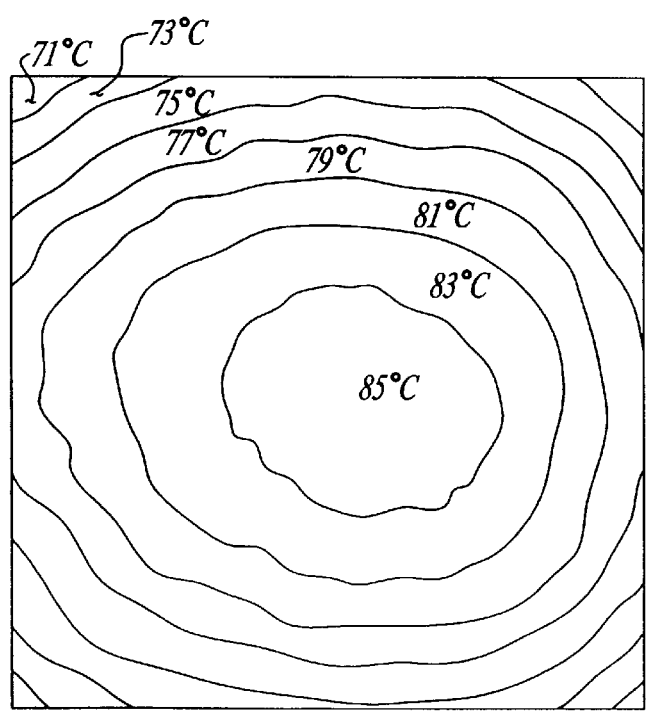
FIG. 4 is a diagram of a temperature distribution of a thermal model for the method of FIG. 2.

In block 34, the method includes the step of running the thermal model to produce a uniform temperature distribution (FIG. 4) of the spray formed rapid tool 16 based on the proposed spray gun travel path. The computer program is executed on a conventional computer and the results of the thermal model are analyzed. The method includes determining any temperature deviations in the temperature distribution as illustrated in FIG. 4. The determination is made by looking for large deviations in temperature profiles, for example, above a predetermined value such as twenty degrees centigrade (20° C.). Additionally, the thermal model can be run and analyzed for high thermal stress levels in the spray formed rapid tool.

After block 34, the method advances to block 36 and includes the step of adjusting the spray parameters and the spray gun tool path to ensure uniform temperature distribution while the spray formed rapid tool 16 is being formed. For example, the power to the thermal spray gun tool can be adjusted and how close the thermal spray gun tool is to the ceramic pattern. It should be appreciated that adjusting the spray parameters and thermal spray gun tool path before spraying takes place saves time and cost.

The method advances to block 38 and includes the step of adjusting supplemental heating or cooling as required. In this step, if heating is required, a non-thermal spray torch may be used to add heat to a portion of the spray formed rapid tool 16 as it is being formed. Also, if cooling is required, a cooling sink such as a jet of air may be used to add cooling to a portion of the spray formed rapid tool 16 as it is being formed.

After block 38, the method advances to block 40 and includes the step of thermal spraying the metal material against the ceramic pattern 14 and forming the spray formed rapid tool 16 as previously described. The method then advances to bubble 42 and ends.

Accordingly, the method reduces distortion in the spray formed rapid tool 16 by maintaining a uniform temperature distribution across the ceramic pattern 14 and thermal spray layer during spraying and the shrinkage will be uniform regardless of phase transformation. The spray formed rapid tool 16 may be stress uniform, i.e. have residual stresses distributed relatively equally, but will accurately match the ceramic pattern 14 with less distortion. By adjusting the spray parameters and the thermal spray gun tool paths, the method produces a uniform temperature distribution while spraying on low melt alloys used as a pattern or as wall stock. The method also allows spraying other materials, which do or do not undergo martensite phase transformations. The method controls the shrinkage of the spray formed rapid tool 16 one layer at a time as the spray formed rapid tool 16 is built up. Regardless of the spray materials used, the spray formed rapid tool 16 will shrink uniformly as it cools to room temperature because each thermal spray layer deposited on a previous layer had a uniform temperature distribution.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of reducing distortion in a spray formed rapid tool comprising the steps of:

making a model of a desired tool;

constructing a ceramic pattern as the inverse of the model;

building a thermal model of the desired tool from a solid model of the ceramic pattern;

applying thermal boundary conditions to the thermal model based on known conditions;

running the thermal model to produce a temperature distribution of the desired tool and determining any temperature deviations in the temperature distribution above a predetermined value; and thermally spraying a metal material against the ceramic pattern to form the desired tool if there are no temperature deviations in the temperature distribution above the predetermined value.

2. A method as set forth in claim 1 including the step of separating the ceramic pattern from the model.

3. A method as set forth in claim 1 including the step of separating the ceramic pattern from the desired tool.

4. A method as set forth in claim 1 including the step of adjusting spray parameters to ensure uniform temperature distribution before said step of thermally spraying.

5. A method as set forth in claim 1 including the step of adjusting either supplemental heating or cooling to eliminate any deviations before said step of thermally spraying.

6. A method as set forth in claim 1 wherein the predetermined value is less than 20° C.

7. A method as set forth in claim 1 wherein the thermal boundary conditions comprise preheat of the ceramic pattern.

8. A method as set forth in claim 1 wherein the thermal boundary conditions comprise cooling during said step of thermally spraying.

9. A method as set forth in claim 1 wherein the thermal boundary conditions comprise thermal loads.

10. A method of reducing distortion in a spray formed rapid tool comprising the steps of:

making a model of a desired tool;

constructing a ceramic pattern as the inverse of the model;

separating the ceramic pattern from the mold;

building a thermal model of the desired tool from a solid model of the ceramic pattern;

applying thermal boundary conditions to the thermal model based on known conditions;

running the thermal model to produce a temperature distribution of the desired tool and determining any temperature deviations in the temperature distribution above a predetermined value;

thermally spraying a metal material against the ceramic pattern to form the desired tool if there are no temperature deviations in the temperature distribution above the predetermined value; and separating the ceramic pattern from the desired tool.

11. A method as set forth in claim 10 including the step of adjusting spray parameters to ensure uniform temperature distribution before said step of thermally spraying.

12. A method as set forth in claim 10 including the step of adjusting either supplemental heating or cooling to eliminate any deviations before said step of thermally spraying.

13. A method as set forth in claim 10 wherein the predetermined value is less than 20° C.

14. A method as set forth in claim 10 wherein the thermal boundary conditions comprise preheat of the ceramic pattern.

15. A method as set forth in claim 10 wherein the thermal boundary conditions comprise cooling during said step of spraying.

16. A method as set forth in claim 10 wherein the thermal boundary conditions comprise thermal loads.

17. A method of reducing distortion in a spray formed rapid tool comprising the steps of:

making a model of a desired tool;

constructing a ceramic pattern as the inverse of the model;

building a thermal model of the desired tool from a solid model of the ceramic pattern;

applying thermal boundary conditions to the thermal model based on known conditions;

running the thermal model to produce a temperature distribution of the desired tool and determining any temperature deviations in the temperature distribution above a predetermined value;

adjusting either supplemental heating or cooling to eliminate any deviations if there are any temperature deviations in the temperature distribution above the predetermined value; and thermally spraying a metal material against the ceramic pattern to form the desired tool.

18. A method as set forth in claim 17 including the step of separating the ceramic pattern from the model.

19. A method as set forth in claim 17 including the step of separating the ceramic pattern from the desired tool.

20. A method as set forth in claim 17 wherein the predetermined value is less than 20 C.

* * * * *